United States Patent [19]
Lanning

[11] 3,936,525
[45] Feb. 3, 1976

[54] REMOVAL OF SULFUR DIOXIDE FROM STACK GASES WITH PHOSPHATE SLIMES

[75] Inventor: Robert L. Lanning, Winter Haven, Fla.

[73] Assignee: United States Steel Corporation, Pittsburgh, Pa.

[22] Filed: Oct. 1, 1973

[21] Appl. No.: 402,644

[52] U.S. Cl. ............................................. 423/242
[51] Int. Cl.² ........................................ C01B 17/00
[58] Field of Search ........................... 423/242–244

[56] References Cited
UNITED STATES PATENTS
3,398,227  8/1968  Every et al. ........................ 423/574
FOREIGN PATENTS OR APPLICATIONS
873,421  7/1961  United Kingdom ................. 423/314

OTHER PUBLICATIONS

Industrial & Engineering Chemistry, Vol. 49, No. 3, Mar. 1957, pp. 392–395.

*Primary Examiner*—Oscar R. Vertiz
*Assistant Examiner*—Gregory A. Heller
*Attorney, Agent, or Firm*—William L. Krayer

[57] ABSTRACT

It has been found that slimes from phosphate ore washer plants may be used to absorb sulfur dioxide from waste gases such as tail gases from sulfuric acid plants or waste gases generated from the combustion of fossil fuels. The sulfur dioxide is retained in the slimes as a bisulfite, subsequently oxidized to bisulfate, and eventually precipitated.

6 Claims, No Drawings

REMOVAL OF SULFUR DIOXIDE FROM STACK GASES WITH PHOSPHATE SLIMES

BACKGROUND OF THE INVENTION

Even before the widespread demand for pollution abatement in industry, much activity was devoted to the removal of sulfur dioxide from waste gases because of its destructive tendencies. Many different approaches have been tried both before and since the increased interest in pollution abatement. However, sulfur dioxide is one of the most pervasive pollutants in industry, and its removal is accomplished only at significant economic penalty.

As examples of patents disclosing various approaches to the removal of sulfur dioxide from stack gases, the reader may be interested in reviewing Eustis, U.S. Pat. No. 1,589,133, Johnstone et al, U.S. Pat. No. 2,161,056, Suriani et al, U.S. Pat. No. 3,574,530, Potts U.S. Pat. NO. 3,630,672, Villers-Fisher et al, U.S. Pat. No. 3,632,306, and Urban, U.S. Pat. No. 3,644,087. Of interest also in the context of the following disclosure will be U.S. Pat. Nos. 3,401,014, 3,421,848 and 3,632,307 to Saeman, Popovici et al and Cornelis van Es et al, respectively. The patent to Potts may be of particular interest because of its use of potassium polyphosphate to absorb sulfur dioxide. The reader may also be interested in the following literature articles:

Volume 6, *Environmental Science and Technology*, "$SO_2$ Removal Technology Enters Growth Phase," pages 688–691; Slack and Falkenberry, "Sulfur Oxide Removal From Waste Gases: Lime-Limestone Scrubbing Technology," Volume 22, *APCA Journal* No. 3, March, 1972, pages 159–166; Horlacher et al, "Four $SO_2$ Removal Systems," Volume 68, *Chemical Engineering Progress*, pages 43–50; Bonnifay et al, "Partial and Total Sulfur Recovery," Volume 68, *Chemical Engineering Progress*, August, 1972, pages 51–52; Potter and Craig "Commercial Experience with an $SO_2$ Recovery Process," Volume 68, *Chemical Engineering Progress*, pages 53–54; and Brown et al, "$SO_2$ Recovery with Activated Carbon," *Chemical Engineering Progress*, Volume 68, pages 55–56. Also of interest may be U.S. Pat. No. 3,671,189 to Betts.

SUMMARY OF THE INVENTION

My invention employs phosphate slimes for the absorption of sulfur dioxide and its subsequent precipitation as part of an insoluble compound such as gypsum or other sulfate. Phosphate slimes are suspensions or slurries of clays, apatite of fluoroapatite, and fine sand in water, averaging from 2 to about 6% solids when discharged from a phosphate rock beneficiation process. They may also include small amounts of limestone and/or dolomite. Phosphate slimes are abundant in areas where phosphate ore is mined, particularly where the ore is of sedimentary origin. A more complete recitation of the composition of a typical phosphate slime will be found later in the specification. The sulfur dioxide may be removed from a waste gas in which it is present in amounts up to 5,000 $ppm_v$, usually about 100 to 5,000 $ppm_v$ reduction to 10 – 20 $ppm_v$ may be accomplished.

The sulfur dioxide is retained in the slimes slurry as bisulphite, and is slowly oxidized to bisulphate on exposure to air. Therefore, it is a part of my invention that the phosphate slime containing the absorbed $SO_2$ is exposed to air so that the residual small $SO_2$ vapor pressure which is in equilibrium with the bisulfite is completely eliminated. The gas is most advantageously scrubbed with the phosphate slimes through the use of conventional scrubbing equipment such as spray towers or Venturi scrubbers.

I have found that a minimum of about ten parts of slime based on the dry solids content thereof is required to absorb one part of sulfur dioxide. This requirement should be taken in the context that the sulfur dioxide content in the off gas is reduced by the absorption process from, perhaps, 1,000 $ppm_v$ to a level of from 200 to 300 parts per million by volume as the objective of the process. A resultant level higher than this is considered to be insufficient. Where the ratio of solids in the phosphate slime to sulfur dioxide is about 20 to 1, the emission of $SO_2$ from the off gas is decreased to the range of 30 to 40 parts per million. Ratios of less than 10 to 1 are technically effective but are considered impractical for most situations.

The sulfur dioxide scrubbing process involves two steps; first, absorption of sulfur dioxide gas to give sulfurous acid, and second, reaction of the formed acid with slimes to give bisulfite. The second reaction, the formation of bisulfite, is the rate controlling step requiring approximately 15 –30 minutes to go to completion.

The nature of the phosphate slimes makes this material most ideal for the absorption of sulfur dioxide as the slimes possess a very high surface area per weight due to the small particle size. Generally more than half of the slimes solids are smaller than 0.5 micron.

In the application of the invention, the sulfur dioxide-containing gas is contacted with the slimes in conventional scrubbing equipment such as spray towers, packed columns or Venturi scrubbers. Depending on the quantity of slimes employed the sulfur dioxide may be reduced in the gas to as little as 10–20 $ppm_v$, as will be explained further.

It is desirable to provide a large enough holdup tank for the scrubber liquid to give a 10–20 minute retention time before the liquid is recirculated through the absorption device. This retention time is necessary to allow sufficient reaction with and absorption of the sulfurous acid in the slimes solids to assure a satisfactory scrubbing performance.

The progress of the consumption of the formed sulfurous acid by the slimes is indicated by the pH of the slurry. At equilibrium conditions, a given acidity of the scrubber liquid corresponds to a certain concentration of sulfurous acid which in turn determines the residual sulfur dioxide concentration in the gas phase. At typical reactant ratios, the slurry pH in the immediate absorption zone ranges from 4.3 to 4.5. On storage for 10–20 minutes the reaction between the slimes and sulfurous acid goes to completion and the pH changes to 5.1–5.2.

The choice of the reactant ratio is mainly determined by the desired sulfur dioxide level in the off-gas. This relationship is shown in Table I where the weight ratio of the slimes solids to the sulfur dioxide in the stack gas is correlated to the resulting sulfur dioxide concentration in the scrubbed gas. In this case, a stack gas containing 2,200 $ppm_v$ sulfur dioxide was used and the flow of phosphate slimes was adjusted to give the listed ratio. See Example I. Accordingly, a ratio of 10:1 is required to achieve a sulfur dioxide reduction of this gas to 200–300 $ppm_v$. Increasing the slimes flow to give a ratio of 30:1 reduces the sulfur dioxide emission to 15–20 ppm$_v$.

The interaction of sulfur dioxide and the phosphate slimes is rather complex, and not merely a neutralization reaction between sulfurous acid and the carbonates of the slimes. For example, a test of a series of slimes samples from different mine locations gave no direct correlation between the carbonate content and scrubbing performance. Table II lists the quantities of slimes solids which were required to maintain a pH of 4.2 in the scrubber liquid in the standard scrubbing test.

TABLE I

SULFUR DIOXIDE SCRUBBING WITH PHOSPHATE SLIMES

| Experiment No. | Slimes Solids/SO$_2$ Wt. Ratio | Scrubber Liquid pH | Off-Gas SO$_2$ ppm$_v$ |
|---|---|---|---|
| 1 | 7.4 | 4.20 | 284 |
| 2 | 7.7 | 4.25 | 265 |
| 3 | 15 | 4.50 | 85 |
| 4 | 20 | 4.70 | 35 |
| 5 | 31 | 5.05 | 15 |
| 6 | 59 | 5.40 | 11 |

TABLE II

SULFUR DIOXIDE SCRUBBING WITH PHOSPHATE SLIMES
COMPARISON OF PERFORMANCE VERSUS COMPOSITION

| Slimes Sample No. | Slimes Solids/SO$_2$ Wt. Ratio to give pH 4.2 | Analysis, % | | | | |
|---|---|---|---|---|---|---|
| | | Solids | CO$_2$ | P$_2$O$_5$ | MgO | pH |
| 1 | 11 | 1.9 | 0.4 | 8.9 | 1.8 | 7.4 |
| 2 | 20 | 2.3 | 0.6 | 6.4 | 2.2 | 7.3 |
| 3 | 31 | 4.5 | 1.3 | 14.5 | 1.6 | 7.3 |
| 4 | 31 | 3.6 | 2.4 | 14.9 | 1.8 | 7.7 |

The residual acidity of the spent slimes can be reduced further by blending with additional fresh slimes. This practice presents no problem since the slimes are usually pumped into a large settling pond anyway where mixing with additional slimes takes place. Settling ponds are known to contain at least some dissolved oxygen so long as they are exposed to the atmosphere.

On prolonged exposure of the spent slimes to atmospheric oxygen, the bisulfite in the spent slimes is slowly oxidized to bisulfate which in turn reacts with the apatite, a form of tricalcium phosphate, or other calcium containing material of the slimes to give gypsum and dicalcium phosphate as the final product.

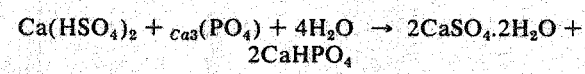

$$Ca(HSO_4)_2 + {}_{Ca3}(PO_4) + 4H_2O \rightarrow 2CaSO_4 \cdot 2H_2O + 2CaHPO_4$$

For best results, the spent slime should be exposed to atmosphere for at least 3 days.

EXAMPLE 1

Simulated stack gas containing 2,200 ppm$_v$ SO$_2$ was passed through Florida phosphate slimes at a rate of 102 liters per hour. A gas dispersion tube was used to provide intimate contact between the gas and the liquid. The slimes were pumped through the scrubber column at the desired rate (a range between 150 and 400 ml per hour) providing a liquid level of 5 inches through which the gas had to pass. The temperature was controlled by external heating to maintain 35°C. Scrubbed gas was passed through two wash bottles containing dilute sodium hydroxide to absorb and determine sulfur dioxide which had not been removed from the gas in the scrubber. The acidity of the phosphate slimes in the scrubber column was monitored by a glass electrode. Results are expressed in Table I.

Throughout this specification, the composition of phosphate slimes slurry used in the examples was as follows:

| | |
|---|---|
| Solids, % | 3.2 |
| pH | 7.2 |

Composition of the slimes solids in percent was as follows:

| | Before Scrubbing | After Scrubbing |
|---|---|---|
| P$_2$O$_5$ | 8.88 | 9.84 |
| CaO | 12.9 | 14.11 |
| Al$_2$O$_3$ | 12.3 | 14.40 |
| Fe$_2$O$_3$ | 2.50 | 2.80 |
| MgO | 3.52 | 1.94 |
| K$_2$O | 0.86 | 0.92 |
| Na$_2$O | 0.48 | 0.35 |
| CO$_3$ | 2.58 | 0.64 |
| F | 0.87 | 0.99 |

However, for my purpose a phosphate slime may be any composition within the ranges of components set forth in Table IV. Table III is a typical composition by minerals:

TABLE III

Approximate mineralogical weight composition of phosphate slimes

| Mineral | Percent |
|---|---|
| Carbonate fluorapatite | 20–25 |
| Quartz | 30–35 |
| Montmorillonite | 20–25 |
| Attapulgite | 5–10 |
| Wavellite | 4–6 |
| Feldspar | 2–3 |
| Heavy minerals | 2–3 |
| Dolomite | 1–2 |
| Miscellaneous | 0–1 |

TABLE IV

Chemical composition of phosphate slimes

| Chemical | Typical analyses, percent | Range, percent |
|---|---|---|
| P$_2$O$_5$ | 12.2 | 5–20 |
| SiO$_2$ | 35.8 | 23–50 |
| Fe$_2$O$_3$ | 3.5 | 1.5–8.5 |
| Al$_2$O$_3$ | 11.9 | 7.5–17 |
| CaO | 1.37 | 8–27 |
| MgO | 2.9 | 0.5–7 |
| CO$_2$ | 2.4 | 0.5–5.5 |
| F | 1.5 | 0.5–2.5 |
| LOI (1,000° C) | 14.6 | 12–15 |
| BPL | 26.7 | 11–43 |

I do not intend to be restricted to the above specific illustrations and embodiments of my invention. It may be otherwise variously practiced within the scope of the following claims.

I claim:
1. Method of removing sulfur dioxide from gases containing at least 100 parts per million by volume sulfur dioxide comprising scrubbing said gases with an effective amount of phosphate slimes to absorb the sulfur dioxide therein to cause chemical reaction of said phosphate slimes with a substantial portion of said sulfur dioxide, which is removed from said waste gas, and exposing the phosphate slime containing the thus removed sulfur dioxide to air for a period of at least 3 days.

2. Method of removing sulfur dioxide from a stream of gas comprising scrubbing said gas with phosphate slimes containing at least about 10 parts solids for each part $SO_2$ treated, to cause chemical reaction of said phosphate slimes with a substantial portion of said sulfur dioxide, which is removed from said waste gas continuously passing said slimes into a retaining vessel to be held for about 10–20 minutes, and recirculating said slimes.

3. Method of removing sulfur dioxide from gases containing at least 100 parts per million by volume sulfur dioxide comprising scrubbing said gases with phosphate slimes to absorb the sulfur dioxide therein to cause chemical reaction of said phosphate slimes with a substantial portion of said sulfur dioxide, which is removed from said waste gas, and exposing the phosphate slime containing the thus removed sulfur dioxide to air for a period of at least 3 days wherein the phosphate slimes employed contain at least about ten parts by weight of solids for each part of $SO_2$ treated.

4. Method of claim 3 in which the phosphate slimes contain from about 2 to about 6% solids consisting essentially of clays, apatite, and fine sand.

5. Method of removing sulfur dioxide from a stream of gas comprising scrubbing said gas with phosphate slimes containing at least about 10 parts solids for each part $SO_2$ treated, continuously passing said slimes into a retaining vessel to be held for about 10–20 minutes, recirculating said slimes to cause chemical reaction of said phosphate slimes with a substantial portion of said sulfur dioxide, which is removed from said waste gas and passing spent phosphate slime to a settling pond in contact with the atmosphere.

6. Method of claim 5 including the step of blending additional fresh slimes into the recirculated slimes.

* * * * *